March 20, 1962 N. GOLD 3,026,489

DOUBLE SIDEBAND SUPPRESSED CARRIER AMPLITUDE MODULATOR

Filed April 6, 1959

INVENTOR.
NATHAN GOLD

United States Patent Office 3,026,489
Patented Mar. 20, 1962

3,026,489
DOUBLE SIDEBAND SUPPRESSED CARRIER AMPLITUDE MODULATOR

Nathan Gold, Newton, Mass.
(23 Lincoln Road, Sharon, Mass.)
Filed Apr. 6, 1959, Ser. No. 804,275
2 Claims. (Cl. 332—44)

This invention relates to radio transmitters and particularly to a double sideband suppressed carrier radio transmitter of novel design.

Methods for the generation of double sideband suppressed carrier signals have been known for many years. Most of these methods involve the use of some form of balanced modulator. The balanced modulator may be a low level stage followed by linear amplification, or may be a high level stage used to drive an antenna. The latter is particularly attractive when converting an amplitude modulation transmitter to double sideband suppressed carrier operation. Any transmitter with a push-pull output stage may be easily converted to a double sideband suppressed carrier transmitter by modifying the push-pull output stage so that it acts as a balanced modulator. This procedure, however, can not be used with a single ended output stage.

I have now invented a double sideband suppressed carrier radio transmitter in which the double sideband suppressed carrier signal is formed in a high level stage and in which said high level stage may be a single ended stage. To obtain this result, I generate the amplitude and phase components of the double sideband suppressed carrier signal separately, rather than generating them both in a single balanced modulator.

Briefly stated, my invention consists of a double sideband suppressed carrier radio transmitter in which the amplitude of the double sideband suppressed carrier signal is generated by passing the audio output from a conventional amplitude modulator amplifier through a full wave rectifier and using this rectified signal to amplitude modulate a high level radio frequency amplifier. The phase component of this double sideband suppressed carrier signal is generated by using the polarity of the modulator amplifier output before rectification to control the phase of the radio frequency excitation applied to the modulated amplifier.

Figure 1:
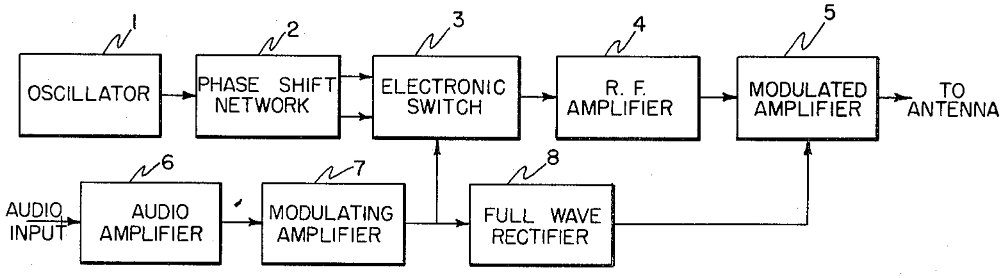
Figure 2:
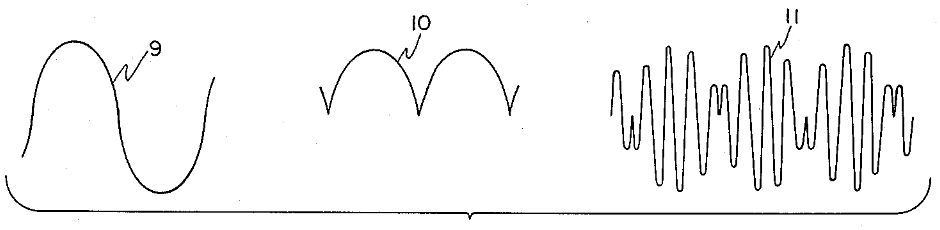

FIG. 1 is a block diagram of a double sideband suppressed carrier transmitter embodiment and FIG. 2 shows the wave forms of the outputs of several components in the embodiment shown in FIG. 1.

The oscillator 1, radio frequency amplifiers 4, audio amplifier 6, modulator amplifier 7 and modulated amplifier 5 shown in FIG. 1 may be any of the types normally used in amplitude modulation radio trismitters. The output of the modulator amplifier 7 is applied to a conventional full wave rectifier 8. Where plate or grid modulation is used, the positive output lead from the full wave rectifier 8 is connected to the same point in the modulated amplifier 5 that the output of the modulator amplifier 7 would have been connected to in a conventional amplitude modulation radio transmitter. If the modulated amplifier is plate modulated, the negative output lead from the full wave rectifier 8 should be connected to ground. If the modulated amplifier 5 is grid modulated, the negative output lead from the full wave rectifier should be connected to a source of bias voltage sufficient to cut off all output from the modulated amplifier 5 when there is no output from the modulator amplifier 7. If cathode modulation is used, the negative output lead from the full wave rectifier is connected to the cathode of the modulated amplifier 5 and the positive output lead from the full wave rectifier 8 is connected to a source of positive bias voltage sufficient to cut off all output from the modulated amplifier 5 when there is no output from the modulator amplifier 7.

The phase shift network may be any conventional circuit that produces two outputs differing in phase when driven by a single input frequency. If there is no frequency multiplication between the phase shift network 2 and the output of the transmitter, the two outputs from the phase shift network should differ in phase by 180 degrees. If there is frequency multiplication between the phase shift network and the output of the transmitter, the two outputs from the phase shift network 2 should differ in phase by any odd multiple of 180 degrees divided by the amount of frequency multiplication. This results in a 180 degree phase shift at the frequency of the output of the transmitter.

The electronic switch 3 connects one output from the phase shift network 2 to RF amplifiers 4 when the unrectified output of the modulator amplifier 7 is of positive polarity, and connects the other output from the phase shift network 2 to the RF amplifier 4 when the unrectified output of the modulator amplifier 7 is of negative polarity. Any conventional form of electronic switch may be used. The choice of circuit depends on the usual considerations of voltage available from the modulator amplifier 7 and voltage available from the phase shift network 2.

The phase component of the double sideband suppressed carrier signal may also be generated by substituting a conventional balanced modulator for the phase shift network 2 and electronic switch 3. The output of the balanced modulator, in passing through the RF amplifier, would be stripped of its amplitude variations but would retain its phase variations if the RF amplifier 4 is operated class C. This method will work only if there is no frequency multiplication following the balanced modulator, or if the frequency is multiplied by an odd number.

FIG. 2 also shows typical waveforms at the output of the modulator amplifier as at 9, output of the full wave rectifier as at 10 and output of the modulated amplifier as at 11. Analysis of the waveform of the output of the modulated amplifier 11 discloses it to be a true double sideband suppressed carrier signal.

What I claim is:

1. Apparatus for generating double sideband suppressed carrier radio signals, said apparatus comprising, in combination, means for amplifying a modulating signal, means for generating a carrier wave signal, means for changing the phase of said carrier signal responsively to reversals of polarity of said modulating signal, means for producing full wave rectification of said modulating signal, and amplifier means for amplitude modulating the phase-changing carrier signal with the full wave rectified signal.

2. Apparatus for generating double sideband suppressed carrier radio signals as defined in claim 1 wherein said means for changing the phase of said carrier signal comprises a phase-shift network having two simultaneous signal outputs which differ in phase, and an electronic switch for passing only one of said outputs when said modulating signal is positive and for passing only the other of said outputs when said signal is negative.

References Cited in the file of this patent

UNITED STATES PATENTS

| | | |
|---|---|---|
| 1,687,245 | Heising | Oct. 9, 1928 |
| 2,870,414 | Isley | Jan. 20, 1959 |
| 2,900,459 | Olive | Aug. 18, 1959 |